United States Patent
Giannini

(10) Patent No.: US 12,319,428 B2
(45) Date of Patent: Jun. 3, 2025

(54) HYBRID-ELECTRIC POWERTRAINS FOR AIRCRAFT

(71) Applicant: The Boeing Company, Arlington, VA (US)

(72) Inventor: Francesco Giannini, Manassas, VA (US)

(73) Assignee: The Boeing Company, Arlington, VA (US)

(*) Notice: Subject to any disclaimer, the term of this patent is extended or adjusted under 35 U.S.C. 154(b) by 0 days.

(21) Appl. No.: 17/881,061

(22) Filed: Aug. 4, 2022

(65) Prior Publication Data

US 2024/0043133 A1 Feb. 8, 2024

(51) Int. Cl.
| | | |
|---|---|---|
| *B64D 35/02* | (2024.01) | |
| *B64C 11/28* | (2006.01) | |
| *B64D 27/02* | (2006.01) | |
| *B64D 27/12* | (2006.01) | |
| *B64D 27/24* | (2024.01) | |

(52) U.S. Cl.
CPC .............. *B64D 35/02* (2013.01); *B64C 11/28* (2013.01); *B64D 27/12* (2013.01); *B64D 27/24* (2013.01); *B64D 27/026* (2024.01); *B64D 2221/00* (2013.01)

(58) Field of Classification Search
CPC ................................................ B64D 2027/026
See application file for complete search history.

(56) References Cited

U.S. PATENT DOCUMENTS

| | | |
|---|---|---|
| 2017/0129617 A1 | 5/2017 | Shah et al. |
| 2018/0065741 A1 | 3/2018 | Vondrell et al. |
| 2018/0297683 A1 | 10/2018 | Armstrong |
| 2019/0118943 A1 | 4/2019 | Machin et al. |

(Continued)

FOREIGN PATENT DOCUMENTS

| | | | |
|---|---|---|---|
| EP | 3388652 A1 | 10/2018 | |
| EP | 3578464 A1 * | 12/2019 | ............. B64D 27/02 |

(Continued)

OTHER PUBLICATIONS

JP H1172043 a PE2E translation.*

(Continued)

*Primary Examiner* — Philip J Bonzell
*Assistant Examiner* — Eric Acosta
(74) *Attorney, Agent, or Firm* — Hanley, Flight & Zimmerman, LLC

(57) ABSTRACT

Hybrid-electric powertrains for aircraft are disclosed herein. An example hybrid-electric powertrain includes a gas turbine propulsion engine including a first propulsor and a gas turbine engine to drive the first propulsor to produce thrust, a generator operably coupled to a drive shaft of the gas turbine engine, and an electric propulsion unit including a second propulsor and an electric motor to drive the second propulsor to produce thrust. During a first mode of operation, the gas turbine propulsion engine and the electric propulsion unit are activated to produce thrust, and the generator is driven by the gas turbine engine to produce electrical power to power the electric propulsion unit. During a second mode of operation, the gas turbine propulsion engine is activated to produce thrust and the electric propulsion unit is deactivated.

23 Claims, 5 Drawing Sheets

(56) References Cited

U.S. PATENT DOCUMENTS

| | | | |
|---|---|---|---|
| 2020/0017225 A1 | 1/2020 | Chung et al. | |
| 2020/0354068 A1 | 11/2020 | Razak et al. | |
| 2022/0243667 A1* | 8/2022 | Rambo | F02C 3/22 |
| 2022/0252011 A1* | 8/2022 | Rambo | F02C 6/08 |

FOREIGN PATENT DOCUMENTS

| | | | | |
|---|---|---|---|---|
| EP | 3594125 A1 | | 1/2020 | |
| EP | 3736423 A1 | | 11/2020 | |
| EP | 3805107 A1 | * | 4/2021 | |
| EP | 3907136 A1 | * | 11/2021 | B60L 50/10 |
| JP | H1172043 A | * | 3/1999 | |
| KR | 102004227 B1 | * | 7/2019 | |

OTHER PUBLICATIONS

Jose L. Miranda, "The Use of an Ultra-Compact Combustor as an Inter-Turbine Burner for Improved Engine Performance," Theses and Dissertations, Mar. 14, 2014, Air Force Institute of Technology AFIT Scholar, url: <https://scholar.afit.edu/etd/754>, 105 pages.

Christopher Spytek, "A Small Multi-Inter Turbine Burner-Enabled Turboshaft engine for UAV Applications," AAIA 2019-4233, Aug. 16, 2019, Aerospace Research Central, url: <https://doi.org/10.2514/6.2019-4233>, 4 pages.

Norris et al., "Hybrid Options: Honeywell Developing APU-Based Turbogenerator; Rolls and GE Focus on New small Turbine Offerings; Verdego Unveils Diesel-Based Hybrid System Plan," Aviation Week & Space Technology, Apr. 6-18, 2021, pp. 16-22, 36, & 61-62, 10 pages.

European Patent Office, "Extended European Search Report," issued in connection with European Patent Application No. 23181581.2-1004, dated Nov. 23, 2023, 9 pages.

* cited by examiner

HYBRID-ELECTRIC POWERTRAINS FOR AIRCRAFT

FIELD OF THE DISCLOSURE

This disclosure relates generally to aircraft and, more particularly, to hybrid-electric powertrains for aircraft.

BACKGROUND

Aircraft typically include one or more engines to produce thrust. There are many different types or arrangements of engines, such as turbofan engines, turboprop engines, etc. In recent years, environmental pressure has spurred renewed efforts to reduce fuel consumption as well as curb emissions.

SUMMARY

An example hybrid-electric powertrain for an aircraft disclosed herein includes a gas turbine propulsion engine including a first propulsor and a gas turbine engine to drive the first propulsor to produce thrust, a generator operably coupled to a drive shaft of the gas turbine engine, and an electric propulsion unit including a second propulsor and an electric motor to drive the second propulsor to produce thrust. During a first mode of operation, the gas turbine propulsion engine and the electric propulsion unit are activated to produce thrust. Further, during the first mode of operation, the generator is driven by the gas turbine engine to produce electrical power to power the electric propulsion unit. During a second mode of operation, the gas turbine propulsion engine is activated to produce thrust and the electric propulsion unit is deactivated.

An example aircraft disclosed herein includes a wing and a hybrid-electric powertrain including a gas turbine propulsion engine coupled to the wing, a generator to be driven by the gas turbine propulsion engine, and an electric propulsion unit coupled to the wing. During a first mode of operation, the gas turbine propulsion engine is activated to produce thrust and the gas turbine propulsion engine drives the generator to produce electrical power for activating the electric propulsion unit to produce thrust. During a second mode of operation, the electric propulsion unit is deactivated.

An example method disclosed herein includes operating a hybrid-electric powertrain of an aircraft in a first mode of operation during a first segment of flight. The hybrid-electric powertrain includes a gas turbine propulsion engine, a generator to be driven by the gas turbine propulsion engine, and an electric propulsion unit. During the first mode of operation, the gas turbine propulsion engine is activated to produce thrust and the gas turbine propulsion engine drives the generator to produce electrical power for activating the electric propulsion unit to produce thrust. The method also includes operating the hybrid-electric powertrain during a second segment of flight in a second mode of operation. During the second mode of operation, the gas turbine propulsion engine is activated and the electric propulsion unit is deactivated.

BRIEF DESCRIPTION OF THE DRAWINGS

In general, the same reference numbers will be used throughout the drawing(s) and accompanying written description to refer to the same or like parts. The figures are not to scale.

Figure 1:
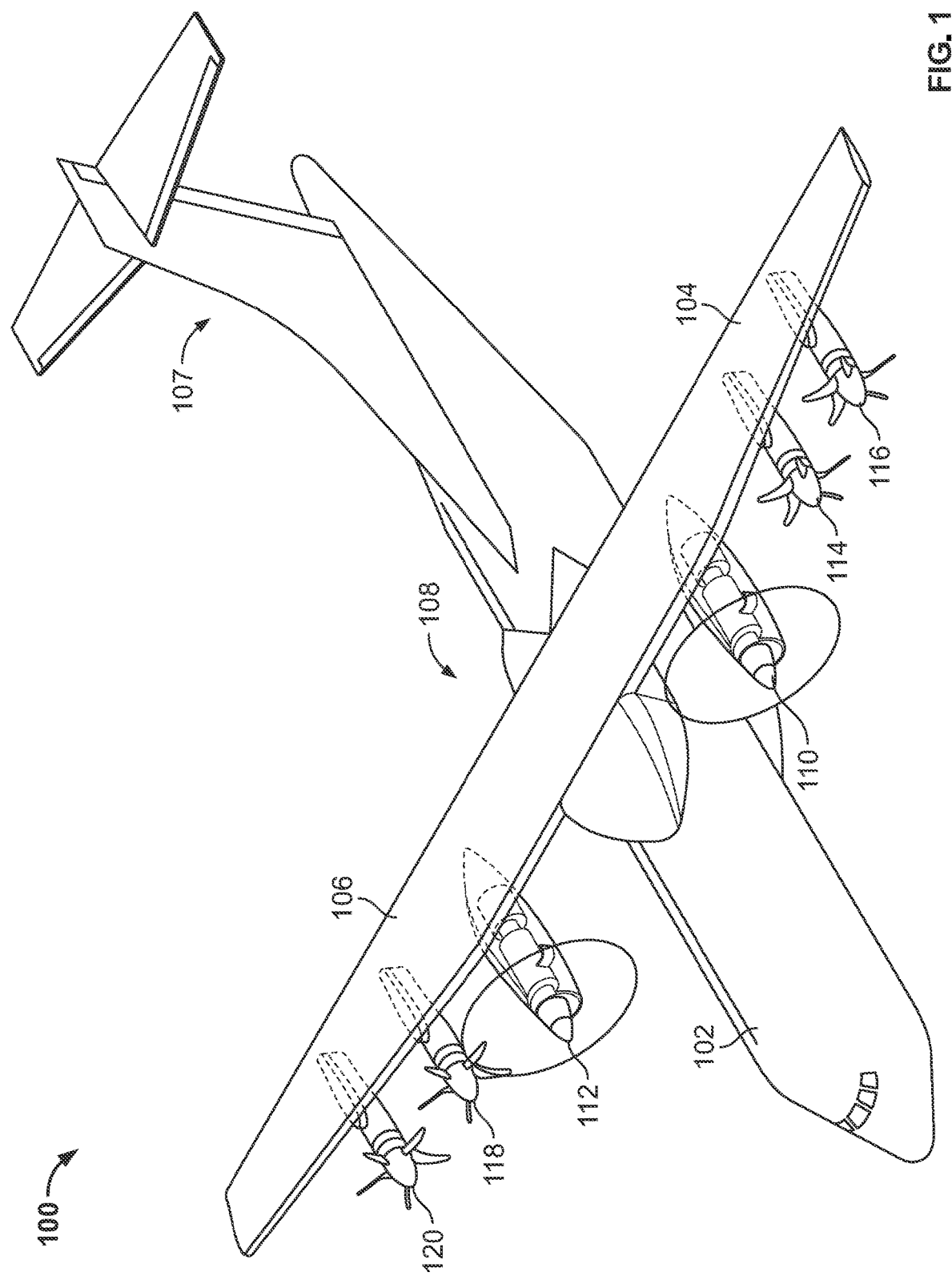
FIG. 1 illustrates an aircraft including an example hybrid-electric powertrain constructed in accordance with the teachings of this disclosure.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

DETAILED DESCRIPTION

Aircraft typically include one or more propulsion engines (e.g., turboprop engines, turbofan engines, etc.) that are powered by hydrocarbon-burning turbine engines, referred to herein as gas turbine engines. These gas turbine engines are typically sized by the maximum power requirements needed for take-off, climb, and emergency situations. In general, gas turbine engines are most fuel efficient at or near their maximum power (e.g., throttle) settings. During cruise, the gas turbine engines operate at reduced a power setting (e.g., around 80% of maximum power). This leads to inefficient operation and additional fuel burn at cruise, because the engines are oversized and operating at sub-optimal power settings for fuel efficiency.

In recent years, environmental pressure has spurred renewed efforts to decrease fuel consumption as well as move away from hydrocarbons to curb emissions. Some concepts focus on using hydrogen as the zero-emissions fuel, and utilize hydrogen fuel cells as the means to convert the fuel into electricity used to power electric motors. Other concepts use batteries and auxiliary powerplants known as 'range extenders' in a series hybrid arrangement. This new breed of distributed hybrid-electric architecture focuses on hydrogen fuel cells as the power generation system or uses batteries and small range-extenders that are scheduled to run near their best operating point. However, the technology readiness level and achievable system-level specific power figures of these architectures is low compared to conventional gas turbine engines, which severely limits the achievable range with these architectures.

Disclosed herein are example hybrid-electric powertrains for aircraft that include one or more gas turbine propulsion engines (used as primary propulsion engines) and one or more electric propulsion units (used as secondary propulsion engines) distributed along the wings of an aircraft. The electric propulsion unit(s) (which can also be referred to as electric propulsion nacelles) include electric motors with propulsors (e.g., propellers, fans) to produce thrust. The example hybrid-electric powertrain can be operated in different modes of operation in which the electric propulsion unit(s) are activated to produce thrust and supplement the thrust provided by the gas turbine propulsion engine(s). This enables the gas turbine propulsion engines to be sized smaller and operate at or near their optimal efficiency ranges during cruise and other segments of flight. This improves fuel efficiency and reduces emissions. Further, the electric propulsion unit(s) can be distributed along the wings of the aircraft and, thus, when activated, can wash the wings with airflow. This arrangement improves lift generation and the increase in the number of propulsors reduces yawing moments in the case of an engine failure. As a result, the wing and the vertical fin areas can be made smaller, with further benefits in terms of cruise efficiency.

To provide electrical power for the electric propulsion unit(s), the example hybrid-electric powertrain includes one or more electric generators that are driven by the gas turbine propulsion engine(s). For example, a gas turbine propulsion engine disclosed herein can be implemented as a turboprop engine that includes a gas turbine engine and a propulsor (e.g., a propeller) that is driven by the gas turbine engine. A drive shaft of the gas turbine engine is mechanically coupled to and drives the generator (during certain modes of operation). Therefore, during periods in which the electric propulsion unit(s) are activated, the generator can generate electrical power to power the electric propulsion unit(s). In some examples, when the electric propulsion unit(s) are not activated, the generator is mechanically and/or electrically decoupled from the gas turbine engine so as not to produce an unnecessary load on the gas turbine engine.

In some examples, the gas turbine engine(s) of the gas turbine propulsion engine(s) include inter-turbine burners (ITBs). An ITB is an additional combustor placed between the gas generator exit and the power turbine to reheat the engine gas stream before it enters the power turbine. The ITBs can be turned on during periods of high-power demand to increase the power output of the gas turbine engine(s). For example, the ITBs can be turned on during take-off or climb. This enables the gas turbine propulsion engines to generate additional power (which equates to additional thrust) during these flight segments. This also provides additional power to drive the electric generators to produce electrical power for powering the electric propulsion units. Therefore, the ITBs can be used to increase engine power at the maximum power setting during certain segments of flight. This enables the gas turbine engines to be sized smaller. As such, the gas turbine engines can be sized so to operate at their most fuel efficient speeds during cruise. Therefore, the gas turbine engines can be sized for better fuel efficiency and lower emissions at cruise, unlike known engines that are oversized for cruise speeds and have to throttle down. Further, gas turbine engines are a convenient source of compressed air for use in the aircraft cabin, whereas hydrogen fuel-cell architectures need other, less expedient means to generate compressed air.

As disclosed above, the example hybrid-electric powertrain can be operated in different modes, which may be based on the segment of flight and/or power demand. For example, during segments of flight that demand higher power, such as during take-off, climb, and landing, the hybrid-electric powertrain can be operated in a first mode of operation. During the first mode of operation, the gas turbine propulsion engines are activated and the electric propulsion units are activated. As such, all of the engines are activated and produce thrust. During the first mode of operation, the gas turbine engines of the gas turbine propulsion engines drive the generators to produce electrical power for operating the electric motors of the electric propulsion units. The ITB can be activated during the first mode of operation to increase power output of the gas turbine engines, which results in higher thrust and additional power for driving the electrical generators. The electric generators power the electric propulsion units, which produce additional thrust that is beneficial during take-off, climb, and landing.

During other segments of flight where less power is demanded, such as during cruise, the hybrid-electric powertrain can be operated in a second mode of operation. During the second mode of operation, the gas turbine propulsion engines are still activated or running, but the electric propulsion units are deactivated (since less thrust is needed to maintain speed and altitude at cruise). During the second mode of operation, the ITBs are deactivated. Further, in some examples, the generator(s) are mechanically and/or electrically decoupled from the gas turbine propulsion engines to reduce load on the gas turbine propulsion engines. In some examples, the hybrid-electric powertrain can be operated in a third mode of operation in which the ITBs are activated for short periods to increase power and thrust of the gas turbine engine, without activating the electric propulsion units. This can be used during periods where quick bursts of power or speed are desired, such as during a dash. A dash is a shorter flight segment flown at maximum continuous speed.

As disclosed above, the electric generators provide power directly to the electric propulsion units. Therefore, in some examples, the hybrid-electric powertrain does not require batteries onboard the aircraft. Batteries are heavy and require significant space. As such, the example hybrid-electric powertrain results in reduced weight and greater fuel efficiency compared to other architectures that utilize batteries onboard the aircraft. Further, in some examples, the gas turbine engines can be run on hydrogen, thus removing the source of pollution, or on jet fuel (e.g., Jet-A fuel), in which case the better matching of the size of the engine to the cruise condition leads to a reduction in fuel consumption and emissions.

Turning now to the figures, FIG. 1 illustrates an aircraft 100 in which the examples disclosed herein can be implemented. In the illustrated example, the aircraft 100 includes a fuselage 102, a first wing 104 (a left wing) coupled to and extending from the fuselage 102, a second wing 106 (a right wing) coupled to and extending from the fuselage 102, and a tail section 107 (sometimes referred to as an empennage). The aircraft 100 may be a manned or unmanned aircraft.

The aircraft 100 includes an example hybrid-electric powertrain 108 that includes multiple engines for generating thrust to fly the aircraft 100. In this example, the hybrid-electric powertrain 108 of the aircraft 100 includes a first gas turbine propulsion engine 110 carried by the first wing 104 and a second gas turbine propulsion engine 112 carried by the second wing 106. In this example, the first and second gas turbine propulsion engines 110, 112 are implemented as turboprop engines. However, in other examples, the first and second gas turbine propulsion engines 110, 112 can be implemented as other types of engines, such as turbofan engines. Further, in the illustrated example, the hybrid-electric powertrain 108 of the aircraft 100 includes a plurality of electric propulsion units distributed along the wings 104, 106 of the aircraft 100. For example, as shown in FIG. 1, the aircraft 100 includes a first electric propulsion unit 114 and a second electric propulsion unit 116 carried by the first wing 104 and a third electric propulsion unit 118 and a fourth electric propulsion unit 120 carried by the second wing 106. The electric propulsion units 114-120 may also be referred to herein electric propulsion modules or nacelles. The gas turbine propulsion engines 110, 112 are powered by hydrocarbon fuel, such as jet fuel (e.g., jet A-1 fuel), whereas the electric propulsion units 114-120 are powered by electrical power. In other examples, the aircraft 100 can include more or fewer gas turbine propulsion engines and/or electric propulsion units and the engines can be arranged in other configurations. Further, while in this example the engines 110-120 are coupled to the wings 104, 106, in other examples one or more of the engines 110-120 can be disposed in other locations on the aircraft 100 (e.g., on the tail section 107).

In some examples, the gas turbine propulsion engines 110, 112 are used as the primary thrust engines, and the electric propulsion units 114-116 are used as secondary thrust engines. The electric propulsion units 114-120 can be activated during certain segments or phases of flight to supplement the thrust generated by the gas turbine propulsion engines 110, 112. For example, during certain phases such as take-off, climb, and landing where higher power is typically needed, the electric propulsion units 114-120 can be activated to produce additional thrust. Then, during other phases such as cruise, the electric propulsion units 114-120 can be deactivated, and the gas turbine propulsion units 110, 112 can remain activated to propel the aircraft 100. This enables the first and second gas turbine propulsion engines 110, 112 to be sized smaller, because the electric propulsion units 114-1120 can be used to provide additional power when needed. As such, the gas turbine propulsion engines 110, 112 can be sized for optimal fuel efficiency at cruise, which accounts for a majority of the flight time, thereby reducing fuel consumption and emissions.

Figure 2:
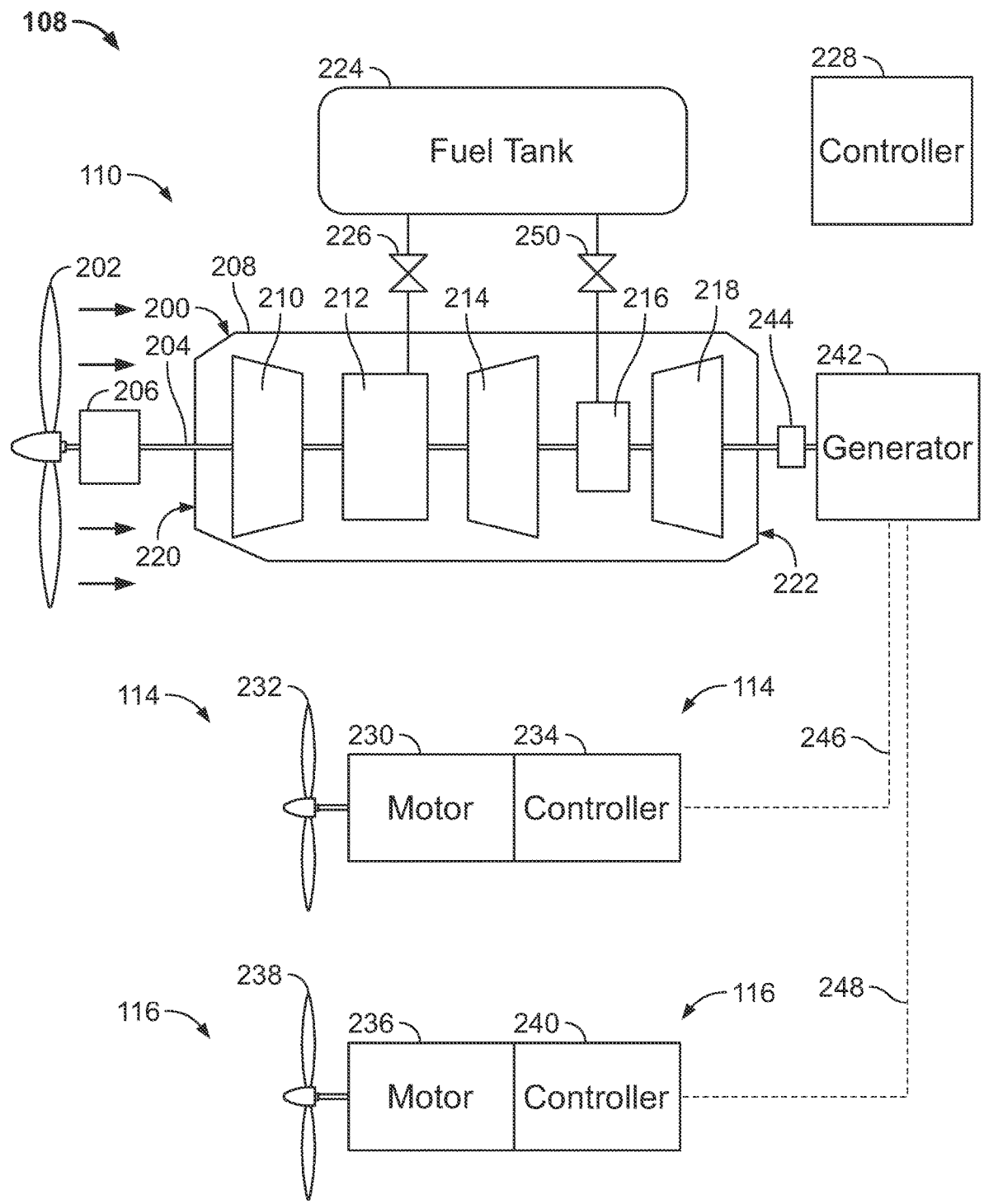
FIG. 2 is a schematic diagram of the example hybrid-electric powertrain of FIG. 1.

FIG. 2 is a schematic diagram of a portion of the example hybrid-electric powertrain 108. In particular, the example hybrid-electric powertrain 108 shown in FIG. 2 shows the first gas turbine propulsion engine 110 and the first and second electric propulsion units 114, 116, but does not show the second gas turbine propulsion engine 112 and the third and fourth electric propulsion units 118, 120. However, it is understood that the hybrid-electric powertrain 108 can also include the second gas turbine propulsion engine 112 and the third and fourth electric propulsion units 118, 120, which can operate in a similar manner as the first gas turbine propulsion engine 110 and the first and second electric propulsion units 114, 116. Therefore, to avoid redundancy, a description of the second gas turbine propulsion engine 112 and the third and fourth electric propulsion units 118, 120 is not provided.

As shown in FIG. 2, the first gas turbine propulsion engine 110 includes a gas turbine engine 200 and a propulsor 202 (sometimes referred to as a disc actuator) coupled to and driven by the gas turbine engine 200 to produce thrust. The gas turbine engine 200 includes a drive shaft 204. The propulsor 202 is coupled to (directly or indirectly) the drive shaft 204. During operation, the gas turbine engine 200 drives (rotates) the propulsor 202 to produce forward thrust. In the illustrated example, the first gas turbine propulsion engine 110 includes a transmission 206 (e.g., a gearbox, a planetary gear system) that couples the drive shaft 204 to the propulsor 202. The transmission 206 can change the rotational speed between the drive shaft 204 and the propulsor 202. In this example, the propulsor 202 is implemented as a propeller. Therefore, in this example, the gas turbine engine 200 and the propulsor 202 form a turboprop engine. In other examples, the propulsor 202 can be implemented as fan of a turbofan engine. The propulsor 202 can be on the front of the first gas turbine propulsion engine 110 (known as a tractor configuration) or on the rear of the first gas turbine propulsion engine 110 (known as a pusher configuration). Also, the propulsor 202 can include two or more propulsors, such as two counter-rotating propellers.

In the illustrated example, the gas turbine engine 200 includes an engine casing 208 and turbomachinery within the casing 208. In this example, the turbomachinery of the gas turbine engine 200 includes a compressor 210, a combustion chamber 212, a high pressure turbine (HPT) 214, an inter-turbine burner (ITB) 216, and a low pressure turbine (LPT) 218. The compressor 210, the HPT 214, and the LPT 218 can include multiple stages. The compressor 210 and at least one of the HPT 214 or the LPT 218 are coupled by the drive shaft 204. In some examples, the compressor 210 includes a high pressure compressor (HPC) that is coupled to and driven by the HPT 214 by a first drive shaft (sometimes referred to as a high pressure spool) and a low pressure compressor (LPC) that is coupled to a driven by the LPT 218 by a second drive shaft (sometimes referred to as low pressure spool). This arrangement is often referred to as a twin-spool configuration.

During operation of the gas turbine engine 200, air enters the gas turbine engine 200 via an inlet 220 and flows to the compressor 210. The compressor 210 increases the pressure of the air and provides the highly pressurized air to the combustion chamber 212. The highly pressurized air is provided to the combustion chamber 212, where fuel is injected and mixed with the highly pressurized air and ignited. The high energy airflow exiting the combustion chamber 212 turns the blades of the HPT 214 and LPT 218. The HPT 214 and/or the LPT 218 rotate the drive shaft 204, which rotates the blades of the compressor 210 and also drives the propulsor 202 (and, thus, produces forward thrust). Further, the heated air exiting the LPT 218 can be exhausted via an exhaust nozzle 222, aftward, where it can produce forward thrust that propels the aircraft 100 in a forward direction.

In the illustrated example, the gas turbine engine 200 is powered by fuel from a fuel tank 224. The fuel is injected into the combustion chamber 212 to run the gas turbine engine 200. In some examples the fuel is jet fuel (e.g., Jet A, Jet A-1, Jet B). In other examples, other types of fuels can be used, such as hydrogen. Fuel flow is controlled by a valve 226. In the illustrated example, the hybrid-electric powertrain 108 includes a controller 228 (e.g., an electronic engine controller (EEC), a processor, etc.). The controller 228 can operate the valve 226 to control the flow of fuel from the fuel tank 224 to the combustion chamber 212 to increase or decrease the speed of the gas turbine engine 200 and control the on/off operations of the first gas turbine propulsion engine 110.

In the illustrated example, the first electric propulsion unit 114 includes an electric motor 230 (e.g., a brushless DC motor) and a propulsor 232 coupled to and driven by the electric motor 230. In this example the propulsor 232 is implemented as a propeller. In other examples, the propulsor 232 can be implemented as a fan or other type of disc actuator. The electric motor 230 can be activated to drive the propulsor 232 to produce thrust. The first electric propulsion unit 114 also includes a controller 234 that controls the operation of the electric motor 230, such as turning on or off the electric motor 230 and/or the adjusting the speed of the electric motor 230. In the illustrated example, second electric propulsion engine unit similarly includes an electric motor 236, a propulsor 238, and a controller 240, which operate the same as the first electric propulsion unit 114.

To produce electrical power for the electric motors 230, 236, the example hybrid-electric powertrain 108 includes an electric generator 242. The generator 242 can be driven by the gas turbine engine 200 of the first gas turbine propulsion engine 110. The generator 242 is operably coupled to the drive shaft 204. In some examples, the generator 242 is directly coupled to the drive shaft 204. In other examples, the generator 242 can be indirectly coupled to the drive shaft 204, such as through one or more offtake shafts or gear boxes. In the illustrated example, the generator 242 is shown as outside of the gas turbine engine 200 (e.g., downstream of the gas turbine engine 200). However, in other examples, the generator 242 can be disposed within the casing 208 of the gas turbine engine 200 or in another position relative to the first gas turbine propulsion engine 110.

In some examples, the generator 242 is only used to provide electrical power to the electric propulsion units 114, 116 during certain phases or segments of flight. In other phases of flight, the generator 242 can be mechanically and/or electrically disconnected so as not to create a load on the gas turbine engine 200. In the illustrated example, the hybrid-electric powertrain 108 includes a disconnect 244 between the generator 242 and the gas turbine engine 200. In some examples the disconnect 244 is a mechanical device such as a clutch. The clutch can be operated by the controller 228 to connect the generator 242 to the drive shaft 204 or disconnect the generator 242 from the drive shaft 204. Additionally or alternatively, the disconnect 244 can be an electromechanical device and/or electrical circuit that prevents the generator 242 from receiving power and producing current. The disconnect 244 can be controlled by the controller 228.

In the illustrated example, the hybrid-electric powertrain 108 has a first power line 246 (e.g., one or more wires or cables) between the generator 242 and the first electric propulsion unit 114 and a second power line 248 between the generator 242 and the second electric propulsion unit 116. The first and second power lines 246, 248 supply electrical power from the generator 242 to the respective first and second electric propulsion units 114, 116.

As discussed above, in some examples, the gas turbine engine 200 includes the ITB 216. The ITB 216 is an additional combustion chamber disposed between the HPT 214 and the LPT 218 to reheat the air exiting the HPT 214. This reheated air has higher pressure for rotating the blades of the LPT 218, thereby increasing the power output of the gas turbine engine 200. The ITB 216 can be turned on or off (activated or deactivated) during certain phases of flight where additional powered is desired. The hybrid-electric powertrain 108 has a valve 250 that controls the flow of fuel from the fuel tank 224 to the ITB 216. The controller 228 can open or close the valve 226 to control fuel flow to the ITB 216 to activate or deactivate the ITB 216. In some examples, the controller 228 can also partially open or close the valve 250 to increase or decrease the fuel flow to the ITB 216 to increase or decrease power on demand. The ITB 216 does not affect the normal operation of the gas turbine engine 200 when the ITB 216 is deactivated. Therefore, the ITB 216 can be selectively activated during certain periods when higher power is demanded. In some examples, the gas turbine engine 200 can include multiple ITBs between the various stages of turbines.

In some examples, the hybrid-electric powertrain 108 can be operated in different modes of operation in which the electric propulsion units 114, 116 are activated or deactivated. The hybrid-electric powertrain 108 may switch between the different modes of operation based on the phase or segment of flight and/or power demands. The controller 228 can control one or more devices (e.g., the valves 226, 250, the disconnect 244, etc.) for causing the hybrid-electric powertrain 108 to switch between the different modes of operation.

For example, the hybrid-electric powertrain 108 can operate in a first mode of operation during periods of high (e.g., peak) power demand, such as during take-off, climb, and/or landing. During the first mode of operation, the first gas turbine propulsion engine 110 and the first and second electric propulsion units 114, 116 are activated, which produces relatively high thrust. During the first mode of operation, the generator 242 is coupled to and driven by the gas turbine engine 200 to produce electrical power for powering the first and second electrical propulsion engines 114, 116. Further, during the first mode of operation, the controller 228 opens the valve 250 to activate the ITB 216, which increases the power output of the gas turbine engine 200. Not only does this increased power help to produce more thrust from the first gas turbine propulsion engine 110, but the increased power is used to drive the generator 242 to produce the electrical power for the electric propulsion units 114, 116.

During periods of lower power demand, such as during cruise, the hybrid-electric powertrain 108 can operate in a second mode of operation. During the second mode of operation, the first gas turbine propulsion engine 110 is activated to produce thrust and the first and second electric propulsion units 114, 116 are deactivated. Therefore, only the gas turbine propulsion engines 110, 112 are active and produce thrust to propel the aircraft 100. However, during cruise, less power is needed to maintain speed and altitude. When switching to the second mode of operation, the controller 228 can close the valve 250 to deactivate or turn off the ITB 216, which helps conserve fuel. Further, the controller operates the disconnect 244 to disconnect the generator 242 from the gas turbine engine 200, such that the generator 242 does not produce an unnecessary load on the gas turbine engine 200. The hybrid-electric powertrain 108 can also operate in the second mode of operation during a loiter segment. During a loiter segment, the goal is to stay in the air using as little fuel as possible (irrespective of the amount of ground covered). Loiter speed is typically slower than cruise.

In some examples, the hybrid-electric powertrain 108 can also operate in a third mode of operation, which may be used during periods where shorter bursts of speed and power are desired, such as during dash. During the third mode of operation, the ITB 216 is activated to increase the power output of the gas turbine engine 200, but the electric propulsion units 114, 116 are deactivated. The increased power of the gas turbine engine 200 produces higher thrust during periods of higher power demand.

As can be appreciated, because the ITB 216 can be selectively activated to increase power on demand, the gas turbine engine 200 can be sized smaller so that power output without the ITB 216 activated matches the requirements for cruise and operates at peak efficiency. This improves fuel efficiency and reduces emissions. When the ITB 216 is activated, the power output is such that the sum of the power going to the propulsor 202 and the power to the electric propulsion units 114, 116 meets the power demand during the highest demand flight segments (e.g., top-of-the-climb, take-off, emergency situations, etc.).

In the illustrated example of FIG. 2, the hybrid-electric powertrain 108 does not include a battery for storing electrical power for the electric propulsion units 114, 116. Instead, the electric propulsion units 114, 116 are only activated when the generator 242 is activated and produces electrical power (e.g., during the first mode of operation). This eliminates the need for batteries onboard the aircraft 100. Batteries are typically very heavy and therefore add weight to the aircraft 100. Also, transferring energy to and from a battery has inherent inefficiencies. Therefore, eliminating the need for batteries can reduce the weight of the system and improve efficiencies. However, in other examples, the hybrid-electric powertrain 108 can include one or more batteries to temporarily store electrical power for the electric propulsion units 114, 116.

Figure 3:
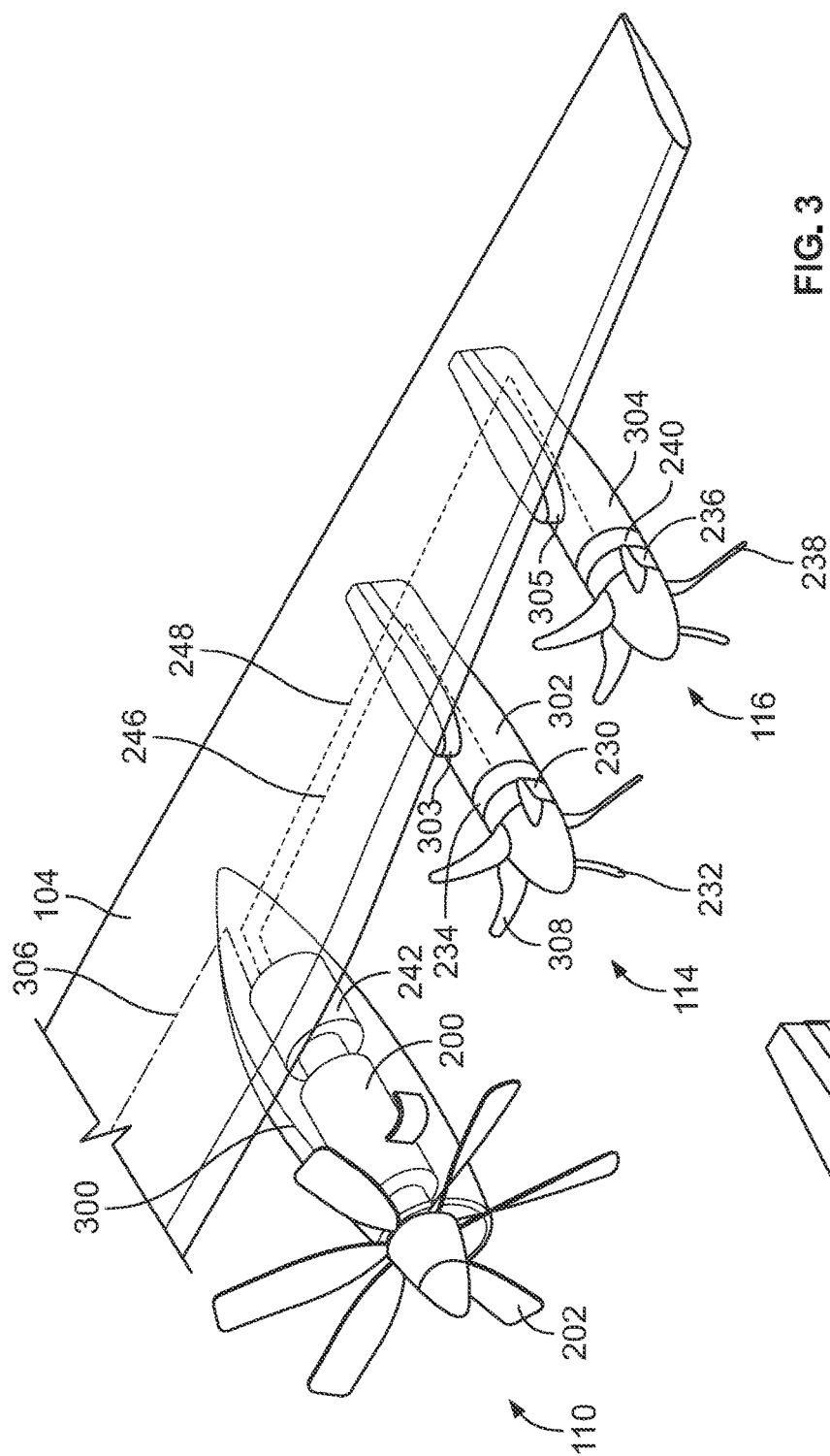
FIG. 3 is a perspective view of one of the wings of the example aircraft of FIG. 1 showing an example gas turbine propulsion engine and multiple example electric propulsion units of the example hybrid-electric powertrain of FIGS. 1 and 2.

FIG. 3 is a perspective view of the first wing 104 showing the first gas turbine propulsion engine 110 and the first and second electric propulsion units 114, 116 coupled to the first wing 104. The first wing 104 is shown as transparent to expose some internal parts and connections. The gas turbine engine 200, the propulsor 202, and the generator 242 are labeled in FIG. 3. In the illustrated example, the gas turbine engine 200 and the generator 242 are disposed within a nacelle 300 that is coupled to the first wing 104. Thus, the generator 242 can be incorporated into the nacelle 300 of the first gas turbine propulsion engine 110. The propulsor 232, the electric motor 230, and the controller 234 of the first electric propulsion unit 114 are also labeled in FIG. 3. The first electric propulsion unit 114 is integrated into and/or coupled to a nacelle 302 that is coupled by a pylon 303 to the first wing 104. The propulsor 238, the electric motor 236, and the controller 240 of the second electric propulsion unit 116 are also shown in FIG. 3. The second electric propulsion unit 116 is similarly integrated into and/or coupled a nacelle 304 that is coupled by a pylon 305 to the first wing 104. In some examples, the first and second electric propulsion units 114, 116 are modular and can be removed from or attached to the first wing 104. This enables one or more of the electric propulsion units 114, 116 to be removed in certain situations to decrease vehicle weight and drag As shown in FIG. 3, the first and second electric propulsion units 114, 116 are spaced apart along the first wing 104 outboard of the first gas turbine propulsion engine 110. In some examples, spacing the electric propulsion units 114, 116 along the first wing 104 is advantageous because the electric propulsion units 114, 116, when activated, produce a more even or uniform flow of air along the first wing 104, which improves lift and control. While in this example the hybrid-electric powertrain 108 includes two electric propulsion units, the hybrid-electric powertrain 108 can include any number of electric propulsion units (e.g., three, four, five, etc.). The plurality of electric propulsion units can be spaced apart in various configurations on the first wing 104.

As shown in FIG. 3, the first and second power lines 246, 248 are disposed in (e.g., routed through) the first wing 104 (e.g., in the wing box) between the generator 242 and the first and second electric propulsion units 114, 116. When the generator 242 is activated (e.g., during the first mode of operation), electrical power is supplied through the power lines 246, 248 to the first and second electric propulsion units 114, 116. Also shown in FIG. 3 is an example cross power line 306, which electrically couples the generator 242 to another generator on the second wing 106. Therefore, if one of the gas turbine propulsion engines 110, 112 and/or the generators is inoperable (e.g., losses power), the other generator can supply power to the electric propulsion units 114, 120 on the other wing. Therefore, power can be easily distributed to the affected side of the aircraft 100.

Figure 4:
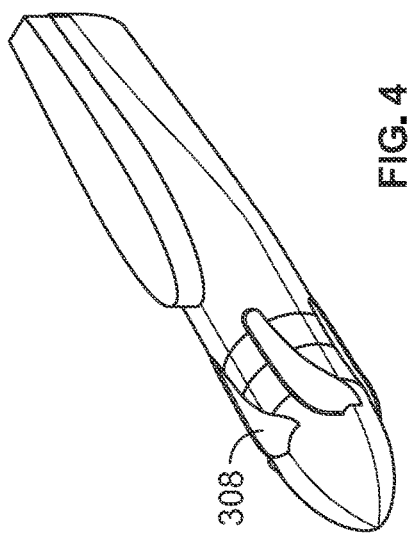
FIG. 4 shows one of the example electric propulsion units of FIG. 3 with example blades of a propeller in a folded position.

In this example, the propulsor 232 of the first electric propulsion unit 114 is implemented as a propeller having a plurality of blades 308 (one of which is referenced in FIG. 3). In some examples, the blades 308 are moveable (e.g., foldable) between a deployed position and a folded position to reduce drag. FIG. 3 shows the blades 308 in the deployed position, and FIG. 4 shows the blades 308 the folded position. In the folded position, the blades 308 are tilted or folded rearward relative to the deployed position. In other examples the blades 308 can be tiled or folded forward. The blades 308 can be moved to the deployed position during times when the electric propulsion units 114, 116 are activated to produce thrust, such as during the first mode of operation (e.g., during take-off, climb, or landing). The blades 308 can be moved to the folded position during times when the electric propulsion units 114, 116 are not activated, such as during the second and third modes of operation. This reduces drag caused by the electric propulsion units 114, 116. In some examples, the blades 308 are moved by an actuator that is controlled by the controller 228. The other electric propulsion units 116, 118, 120 can similarly include foldable propeller blades. In other examples, the electric propulsion units 114-120 can include other means for reducing drag when not activated, such as feathering blades, or fan duct covers in the case of ducted solutions.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

While an example manner of implementing the controller 228 is illustrated in FIG. 2, one or more of the elements, processes, and/or devices illustrated in FIG. 2 may be combined, divided, re-arranged, omitted, eliminated, and/or implemented in any other way. Further, the example controller 228 of FIG. 2 may be implemented by hardware alone or by hardware in combination with software and/or firmware. Thus, the example controller 228 could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example controller 228 of FIG. 2 may include one or more elements, processes, and/or devices in addition to, or instead of, those illustrated in FIG. 2, and/or may include more than one of any or all of the illustrated elements, processes and devices.

Figure 5:
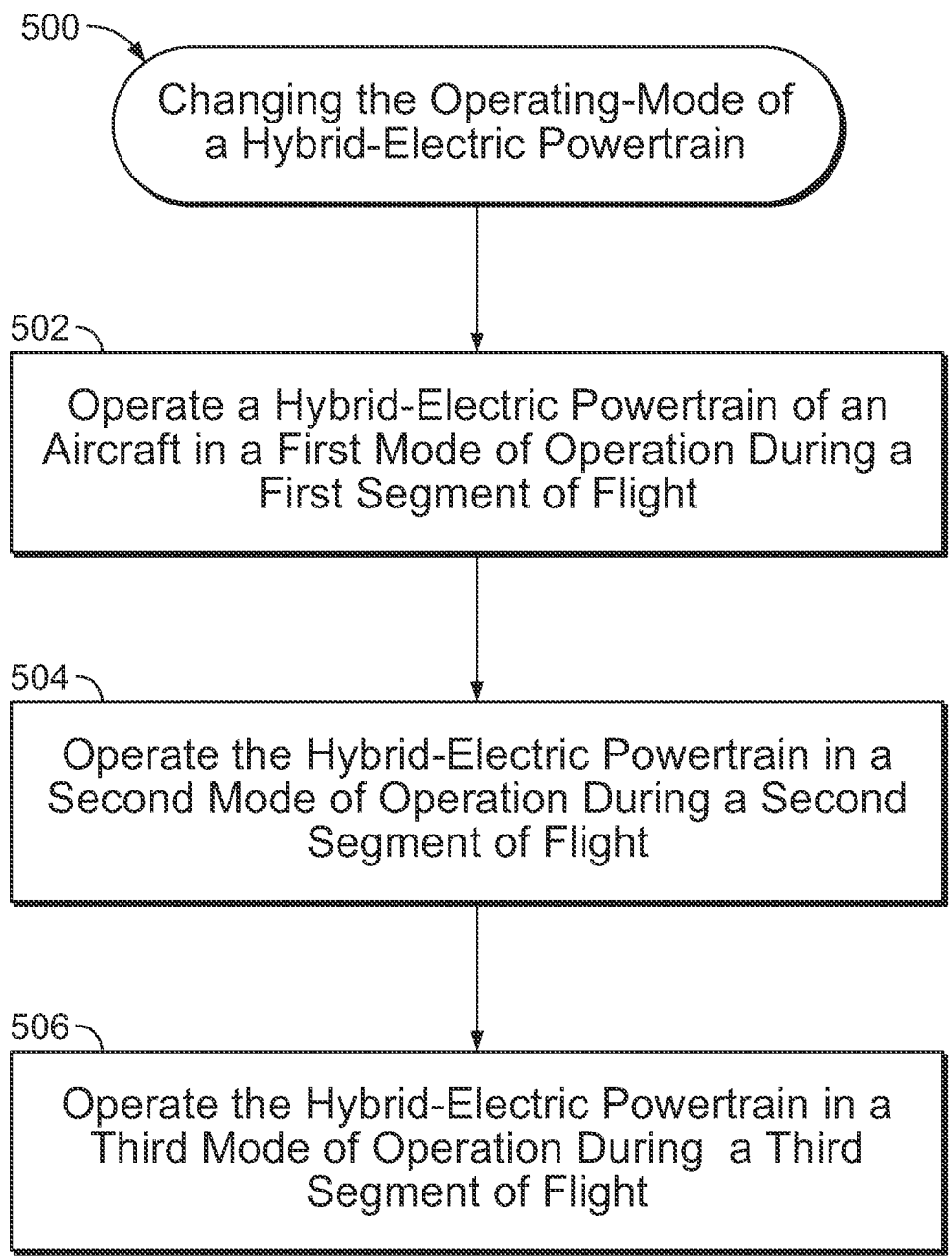
FIG. 5 is a flowchart representative of an example method of operating the example hybrid-electric powertrain of FIGS. 1 and 2 in different modes of operation.

A flowchart representative of example machine readable instructions, which may be executed to configure processor circuitry to implement the controller 228 of FIG. 2, is shown in FIG. 5. The machine readable instructions may be one or more executable programs or portion(s) of an executable program for execution by processor circuitry, such as the processor circuitry 612 shown in the example processor platform 600 discussed below in connection with FIG. 6. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example controller 228 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of an example method 500 of changing the operating-mode of a hybrid-electric powertrain of an aircraft. The example method 500 is disclosed in connection with the hybrid-electric powertrain 108. The example method 500 can be performed at least in part by the controller 228 of FIG. 2, which controls the various devices (e.g., the disconnect 244, the valves 226, 250, etc.) to cause the hybrid-electric powertrain 108 to operate in the different modes of operations. Therefore, the example method 500 may be representative of machine readable instructions and/or example operations that may be executed and/or instantiated by processor circuitry.

At block 502, the hybrid-electric powertrain 108 is operating in the first mode of operation during a first segment of flight. The first segment of flight may correspond to a segment where higher (e.g., peak) power is demanded, such as during take-off, climb, or landing. In the first mode of operation, the gas turbine engine 200 is active and drives the propulsor 202 to generate thrust. Additionally, the first and second electric propulsion units 114, 116 are active to produce additional thrust. During the first mode of operation, the generator 242 is mechanically coupled to and driven by the drive shaft 204. For example, the controller 228 can control the disconnect 244 to connect the generator 242 to the drive shaft 204. The generator 242 produces electrical power that powers the electric motors 230, 236 of the first and second electric propulsion units 114, 116. In some examples, during the first mode of operation, the ITB 216 is activated. For example, the controller 228 can open the valve 250 to enable fuel to flow to the ITB 216. This increases the power output of the gas turbine engine 200, which results in high thrust and additional power for driving the generator 242.

At block 504, the hybrid-electric powertrain 108 operates in the second mode of operation during a second segment of flight. The second segment of flight may correspond to a segment where lower power is demanded, such as during cruise. In the second mode of operation, the gas turbine engine 200 is active and drives the propulsor 202 to generate thrust. However, the first and second electric propulsion units 114, 116 are deactivated. The controller 228 can activate the disconnect 244 to disconnect the generator 242 from the gas turbine engine 200, so that the generator 242 does not create an unnecessary load on the gas turbine engine 200. During the second mode of operation, the ITB 216 is deactivated. The controller 228 can close the valve 250 to shut off fuel flow to the ITB 216.

At block 506, the hybrid-electric powertrain 108 operates in the third mode of operation during a third segment of flight. The third segment of flight may correspond to a segment where high power is needed for a relatively short period of time, such as during a dash maneuver. During the third mode of operation, the ITB 216 is activated to increase the output power of the first gas turbine propulsion engine 110. This provides increased thrust that may be desired to perform the dash maneuver. However, during the third mode of operation, the electric propulsion units 114, 116 remain deactivated.

In some examples, when the electric propulsion units 114, 116 are not activated, such as during the second and third modes of operation, the blades 308 of the electric propulsion units 114, 116 can be moved to the folded position to reduce drag. The controller 228 can activate one or more actuators to move the blades 308 to the folded position. Then, when the electric propulsion units 114, 116 are to be activated, such as during the first mode of operation, the controller 228 can activate the actuator(s) to move the blades 308 back to the deployed position.

In some examples, the controller 228 can automatically control the hybrid-electric powertrain 108 to switch between the different modes of operation. For example, the controller 228 can detect (e.g., via one or more sensors and/or input(s)) the segment of flight. Based on the segment of flight, the controller 228 can switch the hybrid-electric powertrain 108 between the different modes of operation. For example, during take-off, climb, and landing, the hybrid-electric powertrain can be operated in the first mode of operation. Then, during cruise, the hybrid-electric powertrain 108 can be operated in the second mode of operation. During a dash maneuver, the hybrid-electric powertrain 108 can be operated in the third mode of operation. Additionally or alternatively, the controller 228 can switch between the different modes of operation based on pilot input. For example, if the pilot requests additional power, the hybrid-electric powertrain 108 can be operated in the first or third modes of operation, and during times of less power demand, the hybrid-electric powertrain 108 can be operated in the second mode of operation.

Figure 6:
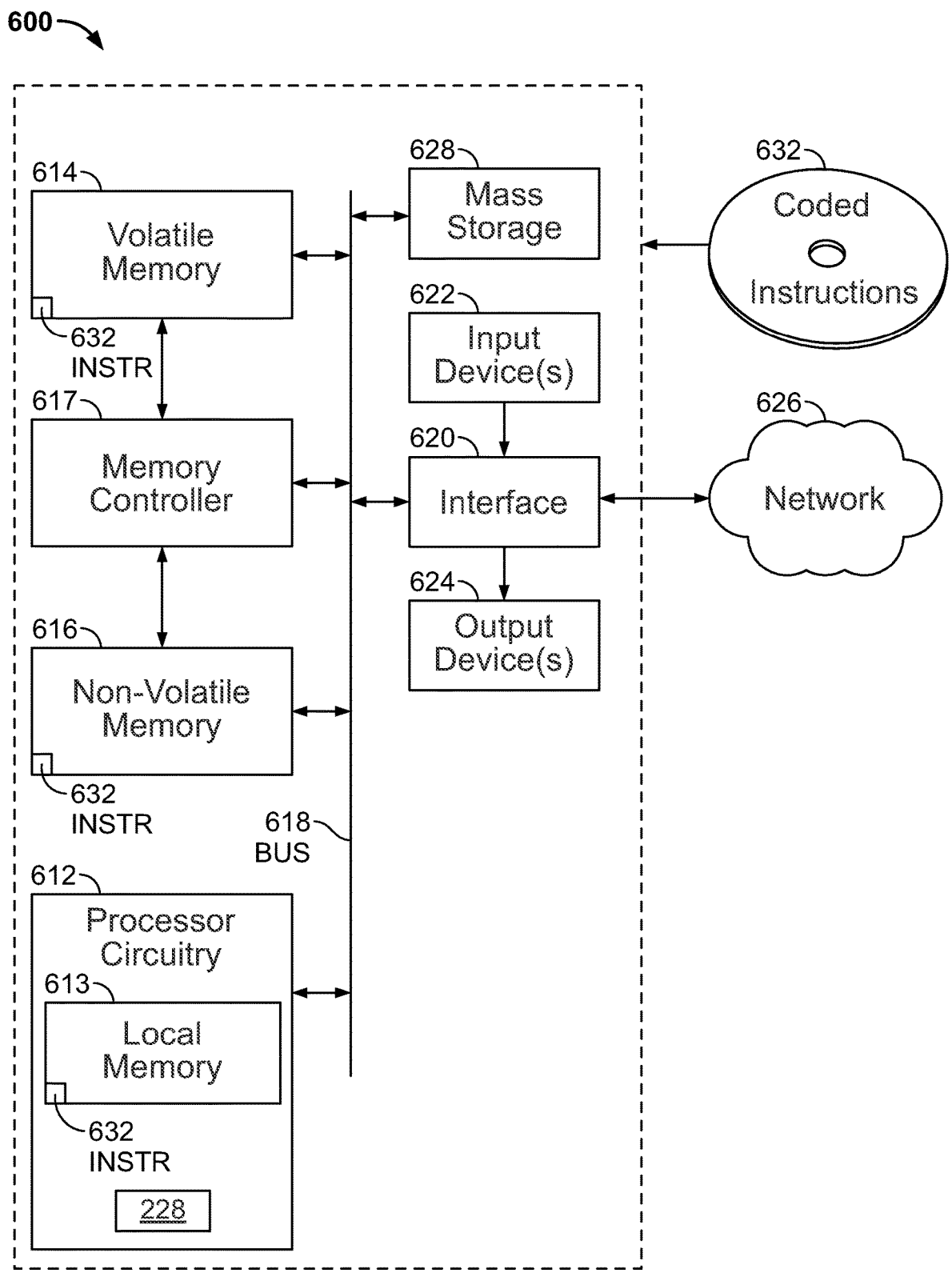
FIG. 6 is a block diagram of an example processing platform including processor circuitry structured to execute the example machine readable instructions and/or the example operations of FIG. 5 to switch the example hybrid-electric powertrain between the different modes of operation.

FIG. 6 is a block diagram of an example processor platform 600 structured to execute and/or instantiate the machine readable instructions and/or the operations of FIG. 5 to implement the controller 228 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs, microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the controller 228.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 622 are connected to the interface circuitry 620. The input device(s) 622 permit(s) a user to enter data and/or commands into the processor circuitry 612. The input device(s) 622 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output device(s) 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

From the foregoing, it will be appreciated that example systems, methods, apparatus, and articles of manufacture have been disclosed that reduce fuel consumption and emissions in aircraft powertrain systems. The examples disclosed herein utilize a unique combination of gas turbine engines and electric engines to enable the gas turbine engines to be sized smaller while still providing sufficient power during peak demand times. Some examples disclosed herein utilize ITBs in the engine cores, which enables the gas turbine engines to be run closer to an optimum design condition while at a partial power setting.

Examples and combinations of the examples disclosed herein include the following:

Example 1 is a hybrid-electric powertrain for an aircraft. The hybrid-electric powertrain comprises a gas turbine propulsion engine including a first propulsor and a gas turbine engine to drive the first propulsor to produce thrust, a generator operably coupled to a drive shaft of the gas turbine engine, and an electric propulsion unit including a second propulsor and an electric motor to drive the second propulsor to produce thrust. During a first mode of operation, the gas turbine propulsion engine and the electric propulsion unit are activated to produce thrust. During the first mode of operation, the generator is driven by the gas turbine engine to produce electrical power to power the electric propulsion unit. During a second mode of operation, the gas turbine propulsion engine is activated to produce thrust and the electric propulsion unit is deactivated.

Example 2 includes the hybrid-electric powertrain of Example 1, wherein the gas turbine engine includes an inter-turbine burner.

Example 3 includes the hybrid-electric powertrain of Example 2, wherein, during the first mode of operation, the inter-turbine burner is activated to increase power output of the gas turbine engine.

Example 4 includes the hybrid-electric powertrain of Example 3, wherein, during the second mode of operation, the inter-turbine burner is deactivated.

Example 5 includes the hybrid-electric powertrain of Example 4, wherein, during a third mode of operation, the inter-turbine burner is activated to increase power output of the gas turbine engine, and the electric propulsion unit is deactivated.

Example 6 includes the hybrid-electric powertrain of any of Examples 1-5, further including a clutch between the generator and the drive shaft to disconnect the generator from the drive shaft during the second mode of operation.

Example 7 includes the hybrid-electric powertrain of any of Examples 1-6, wherein the second propulsor is a propeller with blades that are moveable between a deployed position and a folded position.

Example 8 includes the hybrid-electric powertrain of Example 7, wherein, during the first mode of operation, the blades are in the deployed position, and during the second mode of operation, the blades are in the folded position.

Example 9 includes the hybrid-electric powertrain of any of Examples 1-8, wherein the electric propulsion unit is a first electric propulsion unit. The hybrid-electric powertrain further includes a second electric propulsion unit. The second electric propulsion unit is activated during the first mode of operation and deactivated during the second mode of operation.

Example 10 includes the hybrid-electric powertrain of any of Examples 1-9, wherein the first propulsor is a propeller, and wherein the gas turbine engine and the propulsor form a turboprop engine.

Example 11 is an aircraft comprising a wing and a hybrid-electric powertrain including a gas turbine propulsion engine coupled to the wing, a generator to be driven by the gas turbine propulsion engine, and an electric propulsion unit coupled to the wing. During a first mode of operation, the gas turbine propulsion engine is activated to produce thrust and the gas turbine propulsion engine drives the generator to produce electrical power for activating the electric propulsion unit to produce thrust, and during a second mode of operation, the electric propulsion unit is deactivated.

Example 12 includes the aircraft of Example 11, wherein the gas turbine propulsion engine includes a gas turbine engine having an inter-turbine burner.

Example 13 includes the aircraft of Example 12, wherein, during the first mode of operation, the inter-turbine burner is activated, and during the second mode of operation, the inter-turbine burner is deactivated.

Example 14 includes the aircraft of any of Examples 11-13, wherein the generator is incorporated into a nacelle of the gas turbine propulsion engine.

Example 15 includes the aircraft of any of Examples 11-14, wherein the hybrid-electric powertrain includes a power line between the generator and the electric propulsion unit, the power line disposed in the wing.

Example 16 includes the aircraft of any of Examples 11-15, wherein the hybrid-electric powertrain includes a plurality of electric propulsion units coupled to the wing, the plurality of electric propulsion units powered by the generator during the second mode of operation.

Example 17 includes the aircraft of Example 16, wherein the plurality of electric propulsion units are spaced apart along the wing outboard of the gas turbine propulsion engine.

Example 18 is a method comprising operating a hybrid-electric powertrain of an aircraft in a first mode of operation during a first segment of flight. The hybrid-electric powertrain includes a gas turbine propulsion engine, a generator to be driven by the gas turbine propulsion engine, and an electric propulsion unit. During the first mode of operation, the gas turbine propulsion engine is activated to produce thrust and the gas turbine propulsion engine drives the generator to produce electrical power for activating the electric propulsion unit to produce thrust. The method also includes operating the hybrid-electric powertrain during a second segment of flight in a second mode of operation. During the second mode of operation, the gas turbine propulsion engine is activated and the electric propulsion unit is deactivated.

Example 19 includes the method of Example 18, wherein the first segment of flight includes take-off and the second segment of flight includes cruise.

Example 20 includes the method of Examples 18 or 19, wherein the gas turbine propulsion engine includes a gas turbine engine with an inter-turbine burner. During the first mode of operation, the inter-turbine burner is activated to increase power output of the gas turbine engine, and during the second mode of operation, the inter-turbine burner is deactivated.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. A hybrid-electric powertrain for an aircraft, the hybrid-electric powertrain comprising:
a fuel source;
a gas turbine propulsion engine including a first propulsor and a gas turbine engine to drive the first propulsor to produce thrust, the gas turbine engine including a combustion chamber and an inter-turbine burner, the combustion chamber and the inter-turbine burner fluidly coupled to the fuel source;
a generator operably coupled to a drive shaft of the gas turbine engine;
a clutch between the generator and the drive shaft; and
an electric propulsion unit including a second propulsor, a plurality of blades moveable between an unfolded position and a folded position, and an electric motor to drive the second propulsor to produce thrust, wherein, during a first mode of operation, the gas turbine propulsion engine and the electric propulsion unit are activated to produce thrust, the generator is coupled to the drive shaft via the clutch, the generator is driven by the gas turbine engine to produce electrical power to power the electric propulsion unit and each of the combustion chamber and the inter-turbine burner receive fuel from the fuel source, and the plurality of blades are in the unfolded position, and during a second mode of operation, the gas turbine propulsion engine is activated to produce thrust, the generator is disconnected from the drive shaft via the clutch, the electric propulsion unit is deactivated, the plurality of blades are in the folded position, and the combustion chamber receives fuel from the fuel source, a fluid flow path between the inter-turbine burner and the fuel source closed during the second mode of operation.

2. The hybrid-electric powertrain of claim 1, wherein, during the first mode of operation, the inter-turbine burner is activated to increase power output of the gas turbine engine.

3. The hybrid-electric powertrain of claim 1, wherein, during a third mode of operation, the inter-turbine burner is activated, and the electric propulsion unit is deactivated.

4. The hybrid-electric powertrain of claim 1, wherein the electric propulsion unit is a first electric propulsion unit, the hybrid-electric powertrain further including a second electric propulsion unit, wherein the second electric propulsion unit is activated during the first mode of operation and deactivated during the second mode of operation.

5. The hybrid-electric powertrain of claim 1, wherein the first propulsor is a propeller, and wherein the gas turbine engine and the propeller form a turboprop engine.

6. The hybrid-electric powertrain of claim 1, wherein the electrical power is transmitted from the generator to the electric propulsion unit without being stored prior to activation of the electric propulsion unit.

7. The hybrid-electric powertrain of claim 1, wherein the gas turbine engine includes a high pressure turbine and a low pressure turbine, and the inter-turbine burner is between the high pressure turbine and the low pressure turbine.

8. The hybrid-electric powertrain of claim 7, wherein the clutch is between the low pressure turbine and the generator.

9. The hybrid-electric powertrain of claim 1, further including an electrical circuit to prevent the generator from receiving power and producing current during the second mode of operation.

10. The hybrid-electric powertrain of claim 1, further including a valve fluidly coupled to the fuel source and the inter-turbine burner, the valve movable between an open position, a closed position, and a plurality of intermediary positions between the open position and the closed position,
wherein during the first mode of operation, the valve is in one of (a) the open position or (b) one of the plurality of intermediary positions, the valve to allow a first amount of fuel to flow from the fuel source to the inter-turbine burner in the open position, the valve to allow a second amount of the fuel to flow from the fuel source to the inter-turbine burner in the one of the plurality of intermediary positions, the second amount less than the first amount, and
wherein during the second mode of operation, the valve is in the closed position to close the fluid flow path between the inter-turbine burner and the fuel source.

11. An aircraft comprising:
a wing; and
a hybrid-electric powertrain including:
a fuel source;
a gas turbine propulsion engine coupled to the wing, the gas turbine propulsion engine including a combustion chamber and an inter-turbine burner, the combustion chamber and inter-turbine burner fluidly coupled to the fuel source;
a generator to be driven by a drive shaft of the gas turbine propulsion engine;
a clutch between the generator and the drive shaft; and
an electric propulsion unit coupled to the wing outboard of the gas turbine propulsion engine, the electric propulsion unit electrically coupled to the generator via a power line extending along a portion of the wing, wherein,
during a first mode of operation, the gas turbine propulsion engine is activated to produce thrust and the gas turbine propulsion engine drives the generator to produce electrical power for activating the electric propulsion unit to produce thrust, a first fluid flow path between the combustion chamber and the fuel source is open, and a second fluid flow path between the inter-turbine burner and the fuel source is open, and
during a second mode of operation, the generator is disconnected from the drive shaft via the clutch, the electric propulsion unit is deactivated, the first fluid flow path is open, and the second fluid flow path is closed.

12. The aircraft of claim 11, wherein the generator is incorporated into a nacelle of the gas turbine propulsion engine.

13. The aircraft of claim 11, wherein the hybrid-electric powertrain includes a plurality of electric propulsion units coupled to the wing, the plurality of electric propulsion units powered by the generator during the second mode of operation.

14. The aircraft of claim 13, wherein the plurality of electric propulsion units are spaced apart along the wing outboard of the gas turbine propulsion engine.

15. The aircraft of claim 11, further including means for disconnecting the generator from the gas turbine propulsion engine during the second mode of operation.

16. The aircraft of claim 11, wherein the power line is a first power line and the electric propulsion unit is a first electric propulsion unit, the hybrid-electric powertrain further including a second electric propulsion unit coupled to the generator via a second power line, the second power line extending along the portion or another portion of the wing.

17. The aircraft of claim 16, wherein the generator is a first generator, the wing is a first wing, the first generator coupled to a second generator on a second wing of the aircraft via a third power line.

18. The aircraft of claim 11, wherein the clutch is between a low pressure turbine of the gas turbine propulsion engine and the generator.

19. A method comprising:
operating a hybrid-electric powertrain of an aircraft in a first mode of operation during a first segment of flight, the hybrid-electric powertrain including a fuel source, a gas turbine propulsion engine having a combustion chamber and an inter-turbine burner fluidly coupled to the fuel source, a generator to be driven by the gas turbine propulsion engine, a clutch between the generator and a drive shaft of the gas turbine propulsion engine, and an electric propulsion unit, wherein, during the first mode of operation, the gas turbine propulsion engine is activated to produce thrust, the generator is coupled to the drive shaft via the clutch, and the gas turbine propulsion engine drives the generator to produce electrical power for activating the electric propulsion unit to produce thrust, each of the combustion chamber and the inter-turbine burner to receive fuel from the fuel source when the hybrid-electric powertrain is operating in the first mode of operation; and operating the hybrid-electric powertrain during a second segment of flight in a second mode of operation, wherein, during the second mode of operation, the gas turbine propulsion engine is activated and the electric propulsion unit is deactivated, the generator is disconnected from the drive shaft via the clutch, and a fluid flow path between the inter-turbine burner and the fuel source is closed when the hybrid-electric powertrain is operating in the second mode of operation.

20. The method of claim 19, wherein the first segment of flight includes take-off and the second segment of flight includes cruise.

21. The method of claim 19, wherein during the first mode of operation, the inter-turbine burner is activated to increase power output of the gas turbine propulsion engine.

22. The method of claim 19, further including operating the hybrid-electric powertrain during a third segment of flight in a third mode of operation, wherein, during the third mode of operation, the gas turbine propulsion engine is activated, the inter-turbine burner is activated, the electric propulsion unit is deactivated, the generator is disconnected from the drive shaft via the clutch, and the fluid flow path between the inter-turbine burner and the fuel source is open.

23. The method of claim 19, wherein the electric propulsion unit includes a plurality of blades moveable between an unfolded position and a folded position, and further including causing the plurality of blades to move to the unfolded position during the first mode of operation and to the folded position in the second mode of operation.

* * * * *